US011200732B1

(12) United States Patent
Weidlich

(10) Patent No.: US 11,200,732 B1
(45) Date of Patent: Dec. 14, 2021

(54) EFFICIENTLY DETERMINING AN ABSORPTION COEFFICIENT OF A VIRTUAL VOLUME IN 3D COMPUTER GRAPHICS

(71) Applicant: Weta Digital Ltd., Wellington (NZ)

(72) Inventor: Andrea Weidlich, Montreal (CA)

(73) Assignee: Weta Digital Ltd.

( * ) Notice: Subject to any disclaimer, the term of this patent is extended or adjusted under 35 U.S.C. 154(b) by 0 days.

(21) Appl. No.: 17/335,892

(22) Filed: Jun. 1, 2021

Related U.S. Application Data

(60) Provisional application No. 63/194,796, filed on May 28, 2021.

(51) Int. Cl.
```
G06T 15/00      (2011.01)
G06T 15/08      (2011.01)
G06T 15/55      (2011.01)
G06T 15/60      (2006.01)
G06T 15/80      (2011.01)
G06N 3/08       (2006.01)
```
(52) U.S. Cl.
CPC .......... *G06T 15/55* (2013.01); *G06N 3/08* (2013.01); *G06T 15/005* (2013.01); *G06T 15/08* (2013.01); *G06T 15/60* (2013.01); *G06T 15/80* (2013.01)

(58) Field of Classification Search
CPC ....... G06T 15/06; G06T 15/506; G06T 15/08; G06N 3/08
See application file for complete search history.

(56) References Cited

U.S. PATENT DOCUMENTS

2014/0198204 A1* 7/2014 Papas ................ G01N 21/4738
348/135

OTHER PUBLICATIONS

Henrik Wann Jensen, Stephen R. Marschner, Marc Levoy and Pat Hanrahan, "A Practical Model for Subsurface Light Transport", ACM SIGGRAPH 2001, Aug. 12-17, 2001 (Year: 2001).*
Marios Papas, Krystle de Mesa and Henrik Wann Jensen, "A Physically-based BSDF for Modeling the Appearance of Paper", Eurographics Symposium on Rendering 2014, vol. 33 (2014), No. 4 (Year: 2014).*
Chengqian Che, Fujun Luan, Shuang Zhao, Kavita Bala and Ioannis Gkioulekas, "Towards Learning-based Inverse Subsurface Scattering", 2020 IEEE International Conference on Computational Photograph (ICCP), Apr. 24-26, 2020. IEEE Xplore: Jun. 2, 2020 (Year: 2020).*

* cited by examiner

*Primary Examiner* — Sing-Wai Wu
(74) *Attorney, Agent, or Firm* — Perkins Coie LLP

(57) ABSTRACT

Disclosed is a method to derive the absorption coefficient, transparency, and/or the scattering coefficient from the user-specified parameters including roughness, phase function, index of refraction (IOR), and color by performing the simulation once, and storing the results of the simulation in an easy to retrieve representation, such as a lookup table, or an analytic function. To create the analytic function, one or more analytic functions can be fitted to the results of the simulation for the multiple parameters including roughness, phase function, IOR, and color. The lookup table can be combined with the analytic representation. For example, the lookup table can be used to represent the color, roughness, and phase function, while the IOR can be represented by an analytic function. For example, when the IOR is above 2, the lookup table becomes three-dimensional and the IOR is calculated using the analytic function.

19 Claims, 11 Drawing Sheets

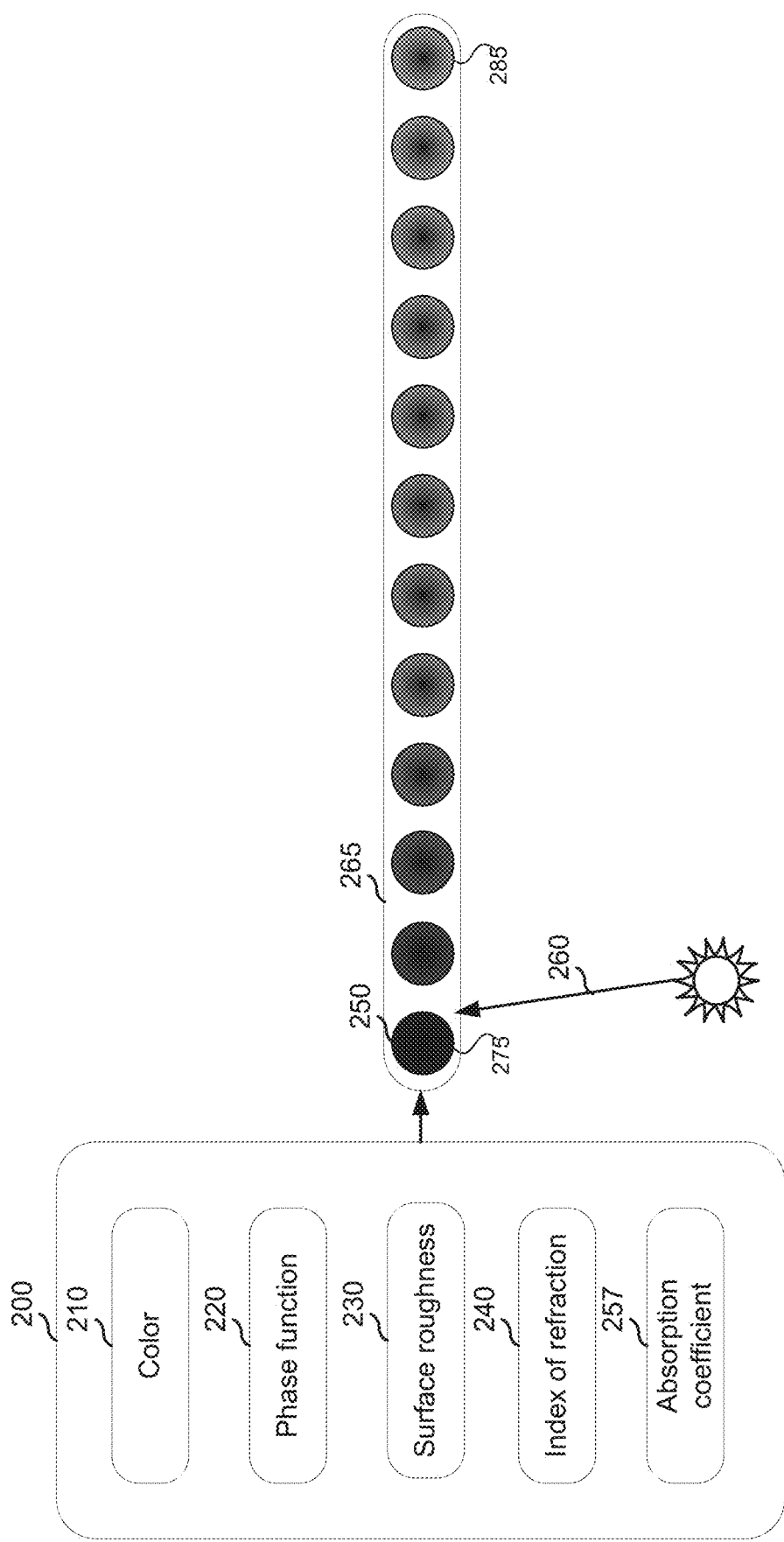

EFFICIENTLY DETERMINING AN ABSORPTION COEFFICIENT OF A VIRTUAL VOLUME IN 3D COMPUTER GRAPHICS

CROSS-REFERENCE TO RELATED APPLICATIONS

This application claims priority to the U.S. provisional patent application Ser. No. 63/194,796 filed May 28, 2021 which is incorporated herein by reference in its entirety.

BACKGROUND

Subsurface scattering (SSS), also known as subsurface light transport (SSLT), is a mechanism of light transport in which light that penetrates the surface of a translucent object is scattered by interacting with the material and exits the surface at a different point. The light will generally penetrate the surface and be reflected a number of times at irregular angles inside the material before passing back out of the material at a different angle than it would have had it been reflected directly off the surface. Subsurface scattering is important for realistic 3D computer graphics, being necessary for the rendering of materials such as marble, skin, leaves, wax, clouds, milk, etc. If subsurface scattering is not implemented, the material may look unnatural, like plastic or metal. One drawback of subsurface scattering is the computational cost required to compute it.

SUMMARY

Disclosed here is a method to derive the absorption coefficient, transparency, and/or the scattering coefficient from the user-specified parameters including roughness, phase function, index of refraction (IOR), and color in a 3D computer graphics by performing the simulation once, and storing the results of the simulation in an easy to retrieve representation, such as a lookup table, or an analytic function for use in rendering of a 3D graphic. To create the analytic function, one or more analytic functions can be fitted to the results of the simulation for the multiple parameters including roughness, phase function, IOR, and color.

The lookup table can be combined with the analytic representation. For example, the lookup table can be used to represent the color, roughness, and phase function, while the IOR can be represented by an analytic function. For example, when the IOR is above 2, the lookup table becomes three-dimensional and the IOR is calculated using the analytic function.

BRIEF DESCRIPTION OF THE DRAWINGS

Detailed descriptions of implementations of the present invention will be described and explained through the use of the accompanying drawings.

FIGS. 2A-2C show an example of volume attributes.

Figure 1:
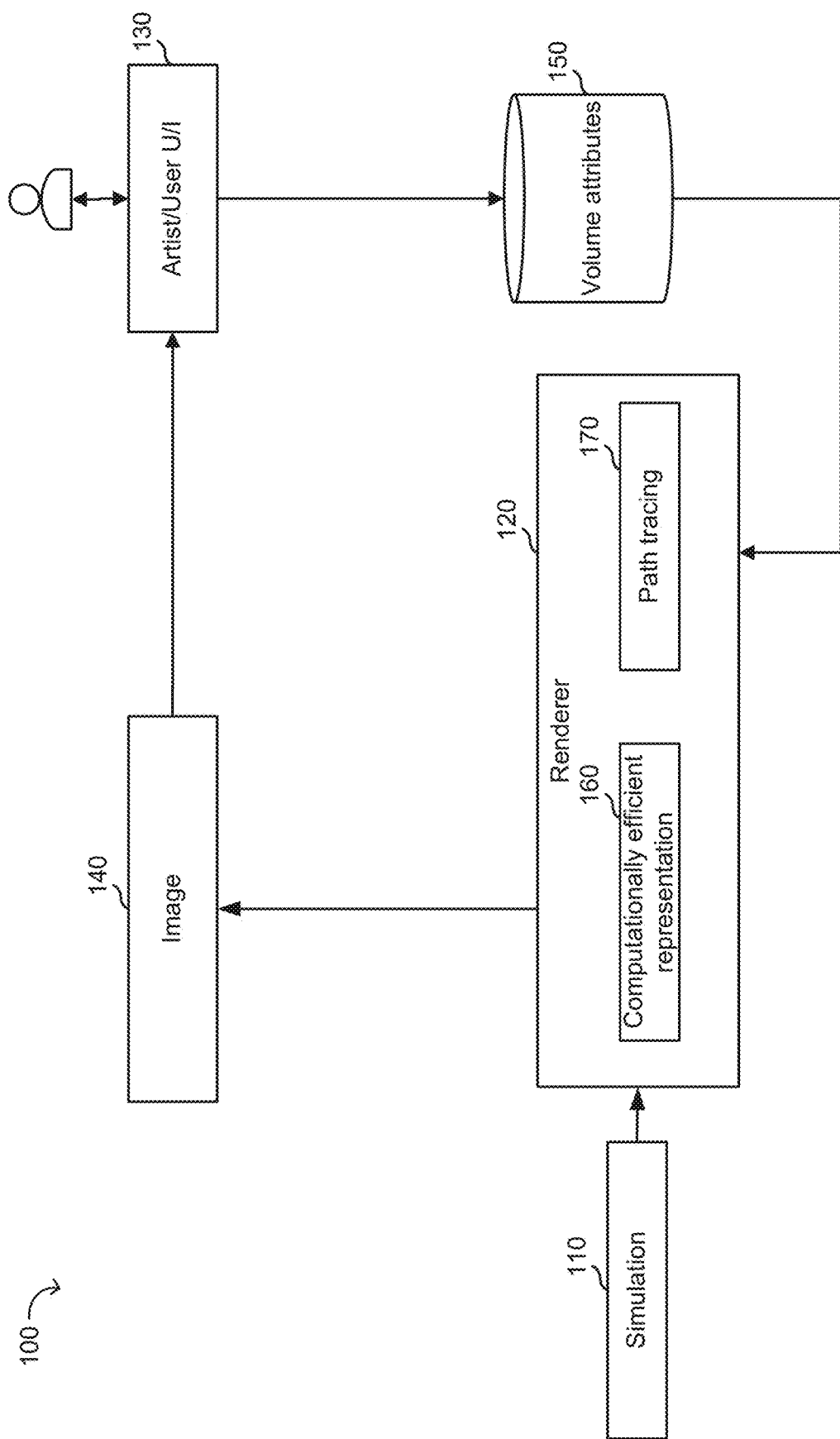
FIG. 1 shows how to efficiently determine an absorption coefficient of a virtual volume.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Efficiently Determining an Absorption Coefficient of a Volume

FIG. 1 shows how to efficiently determine an absorption coefficient of a virtual volume. The system 100 includes a simulator 110, a renderer 120, a user interface 130, an image 140, and volume attributes 150.

The renderer 120 generates the image 140, which is presented to the user through the user interface 130. The user interface 130 can receive from the user specification of volume attributes 150. For example, the user can work on shading a translucent three-dimensional object occupying a volume through which light scatters. The volume attributes 150 can include color, that is, albedo, phase function, surface roughness, 10R, absorption coefficient, scattering coefficient, and/or transparency.

While the user can intuitively specify certain volume attributes 150, some of the attributes are difficult such as absorption coefficient, scattering coefficient, and/or transparency. In addition, the volume attributes 150 depend on each other. For example, absorption coefficient, scattering coefficient, and/or transparency depend on color, phase function, surface roughness, and IOR.

To aid the user, the system 100 enables the user to specify only a subset of the volume attributes 150, and the system automatically determines the remainder of the volume attributes. For example, the user can specify the color, phase function, surface roughness, and IOR, and the system can determine the absorption coefficient.

To determine the unspecified attribute, the system 100 can perform a simulation on a simulator 110 which models a virtual ray of light interacting with the volume based on the multiple volume attributes. The virtual ray of light can include one or more wavelengths of electromagnetic radiation. The simulation can include path tracing a virtual ray of light through the volume, which can be extremely computationally expensive, on the order of tens of hours. Consequently, to reduce the computation time of the simulation, the system 100 performs the simulation only once and represents the results in a computationally efficient representation 160.

The computationally efficient representation 160 can include a lookup table and/or an analytic function. The analytic function offers both memory savings and speed savings over the lookup table. However, the lookup table, in some cases, can provide a more accurate representation. The computationally efficient representation 160 can include a hybrid approach including both the lookup table and analytic function. Retrieving, for example, the absorption coefficient from the lookup table or computing the absorption coefficient from the analytic function increases the speed of computation by a thousand times. The computationally efficient representation 160 is independent of wavelength of the virtual ray of light, and a single computationally efficient representation 160 can be used for various wavelengths in a color system such as red green blue (RGB), cyan magenta yellow (CMY), cyan magenta yellow key (CMYK).

Once the user adjusts the volume attributes 150, the renderer 120 can determine the missing volume attributes and can provide the missing volume attributes to the user through the user interface 130. In addition, the renderer can use the computationally efficient representation 160 and a rendering algorithm, such as path tracing 170, to produce the image 140 of the scene based on the newly specified volume attributes 150. Subsequently, the user can engage in an iterative process of adjusting the volume attributes 150 based on the received image 140.

Figure 2B:
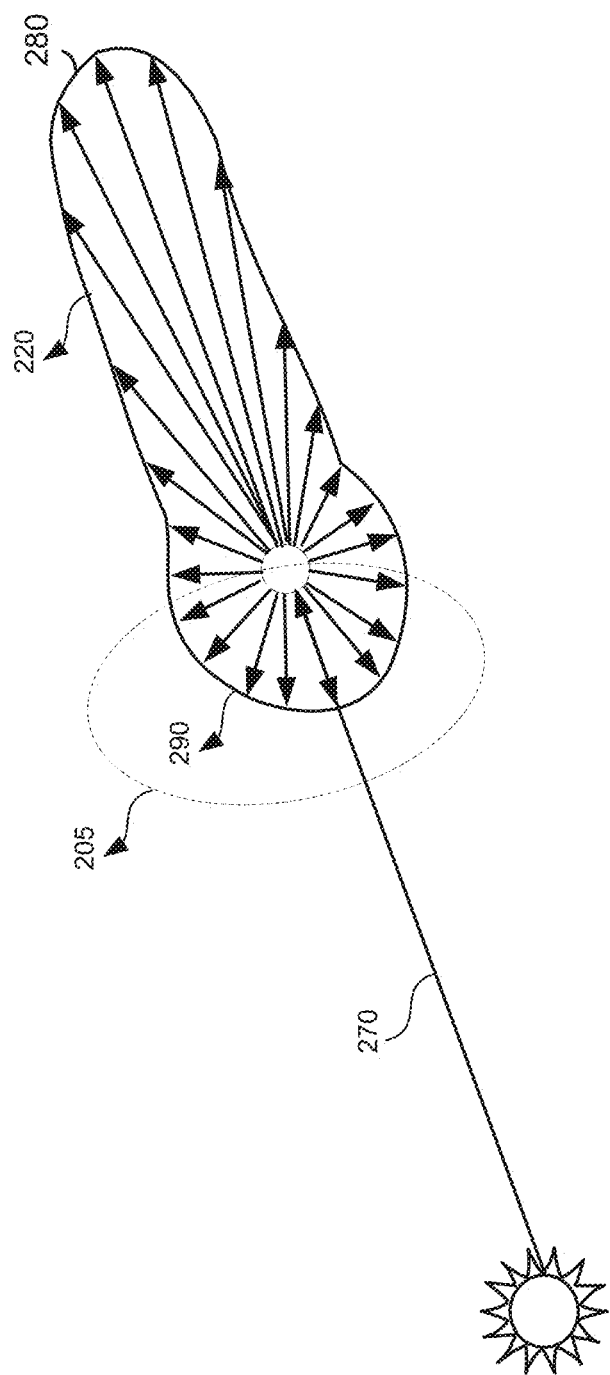
Figure 2C:
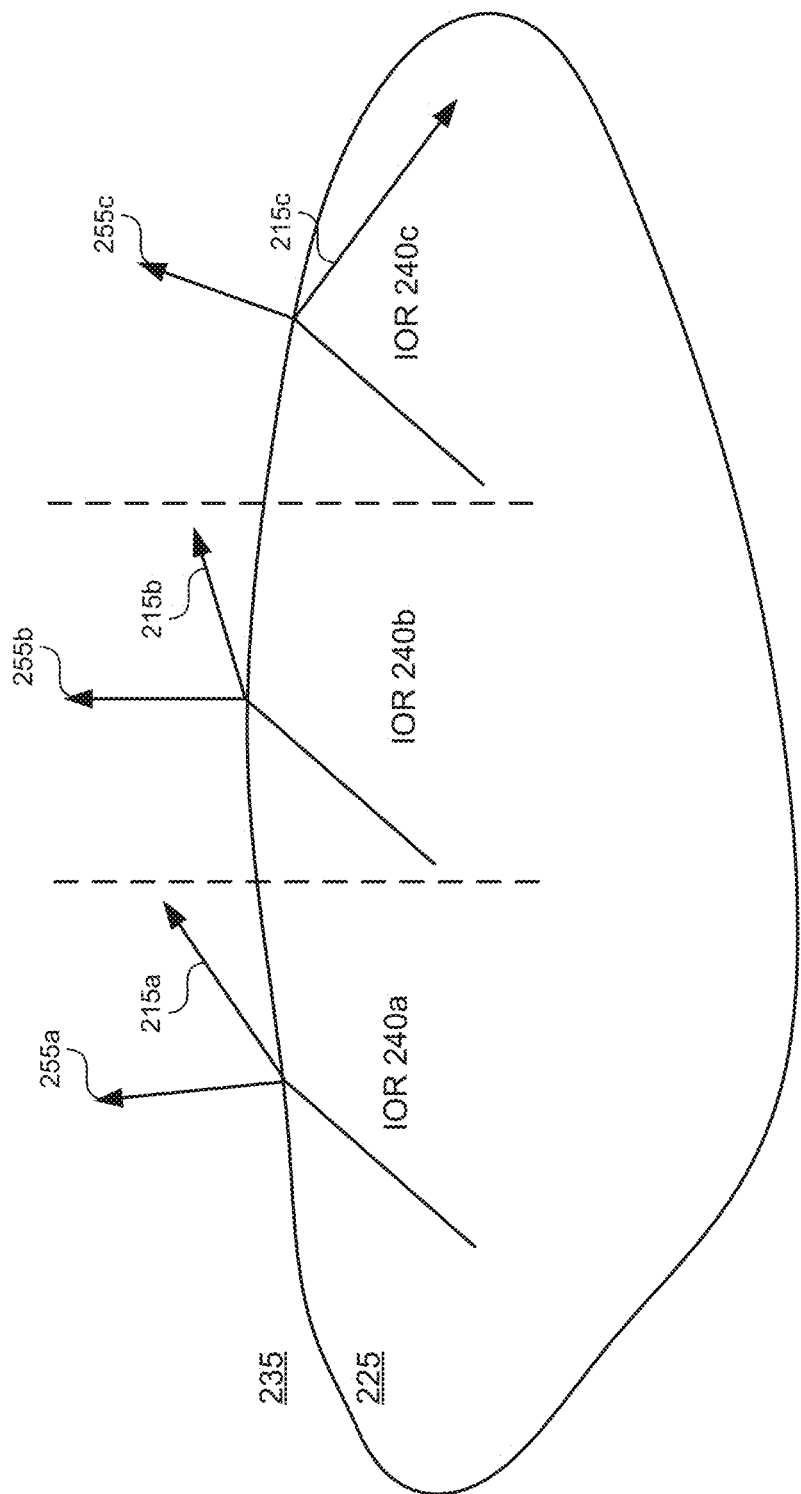

FIGS. 2A-2C show an example of volume attributes. The volume attributes 200 can be part of a shading program that describes volume attributes 200 and how a virtual ray of light 260 interacts with the volume 250. The volume attributes 200 can include color 210, phase function 220, surface roughness 230, and index of refraction (IOR) 240.

The user can specify color 210, phase function 220, surface roughness 230, and IOR 240. For example, the user can paint the surface color of the volume 250 to specify the color 210, or the user can, in three dimensions, paint the volumetric color of the volume 250 to specify the color 210. Surface roughness 230 indicates how diffuse is the color of the volume 250 surface. Metallic objects have low surface roughness.

FIG. 2B shows a phase function 220. The phase function 220 describes a probability that an incoming virtual ray of light 270 scatters in a direction 280, 290 (only two labeled for brevity). The phase function 220 can be a Henyey-Greenstein phase function. The higher the magnitude of the vector in the direction 280, the more likely the incoming virtual ray of light 270 is to scatter in the direction 280. The directions 205 indicate that the ray of light 270 has back scattered. The user can specify a single function for the entire volume 250, or the user can specify a phase function for the volume 250. For example, the user can paint the phase function 220 inside and on the surface of the volume 250.

FIG. 2C shows how an IOR 240a-c influences the path of the virtual ray of light 215a-c. IOR 240 of a material is a dimensionless number that describes how fast light travels through the material. When light 215 moves from one medium 225 to another 235, it changes direction, that is, it is refracted. If it moves from a medium with IOR n1 to one with IOR n2, with an incidence angle to the surface normal of θ1, the refraction angle θ2 can be calculated from Snell's law:

$$n1*\sin\theta1 = n2*\sin\theta2$$

When light 215 enters a material with higher IOR, the angle of refraction will be smaller than the angle of incidence and the light will be refracted toward the normal of the surface. The higher the refractive index, the closer to the normal direction the light will travel. When passing into a medium with a lower refractive index, the light will instead be refracted away from the normal 255a-c, toward the surface. In FIG. 2C, IOR 240a<IOR 240b<IOR 240c.

Usually, the volume 225 has a higher IOR than the air 235. When light 215 refracts at the surface 245 of the volume 225, the light 215 refracts away from the normal 255a-c. The higher the IOR of the volume 225, the more the light 215 refracts, until the light 215c undergoes total internal reflection and refracts back into the volume 225. As IOR increases, the number of rays undergoing total internal reflection increases. Consequently, the simulation of the light 215 path becomes too time consuming to calculate since whenever the light 215 hits the surface from the inside, the majority is reflected back which causes very long paths. In addition, with increasing IOR, the calculated solution becomes numerically instable and not accurate enough because small differences in the light 215 path, for example, 0.00001 and 0.00002, produce a different result once the IOR is above, say, 2.0. So instead of simulating the light 215 reflecting and refracting, the system extrapolates the data for increase in IOR by fitting the IOR data to a formula. The same formula can be inverted to recover the data.

In one embodiment, when the IOR 240 exceeds 2.0, the system represents the change in the IOR with an analytic function. Consequently, the computationally efficient representation 160 in FIG. 1 is a combination of a lookup table, which includes volume attributes color 210, phase function 220, and surface roughness 230, and an analytic function representing IOR 240 data. When IOR 240 is less than or equal to 2.0, the computationally efficient representation 160 can include a lookup table for all volume attributes 210, 220, 230, 240.

In another embodiment, the system can perform the simulation, gather the simulation data, and, based on the simulation data, create the computationally efficient representation 160 in the form of an analytic function for all of the volume attributes 210, 220, 230, 240. For example, the analytic function of the volume attributes can be a Riemann distribution.

In FIG. 2A, based on the volume attributes 210, 220, 230, and 240, the system can calculate the dependent attribute 257. The dependent attribute 257 can be the absorption coefficient of the volume 250, transparency of the volume 250, or scattering coefficient of the volume 250. The absorption, transparency, or scattering coefficients can be derived from each other. In other words, if the absorption coefficient is known, transparency can be calculated because transparency is inversely proportional to absorption, and vice versa. Similarly, if the absorption coefficient is known, the scattering coefficient can be computed, and vice versa.

The absorption coefficient indicates how much light ray 215a-c energy is swallowed by the volume 225. The scattering coefficient indicates the probability of how often the direction of the light ray 215a-c changes into directions 280, 290 upon a scattering event. In other words, the scattering coefficient indicates the length of the distance the light ray 215a-c can travel in the volume 225 before its direction changes. The absorption coefficient and the scattering coefficient are related with a formula that can be used to compute the absorption coefficient given the scattering coefficient, and vice versa.

The absorption coefficient is inversely correlated to the IOR. The higher the IOR, the longer the path of the light ray 215a-c in the volume 250 and the more chances that the light ray 215a-c is absorbed. Consequently, if the IOR is high and the absorption coefficient is high, the light ray 215a-c is extinguished inside the volume 250 and does not contribute to the surface color. As a result, the higher the IOR is, the lower the absorption coefficient of the volume 250 becomes to enable the light ray 215a-c to exit the volume 250 and contribute to the surface color.

Row of images 265 in FIG. 2A shows changing translucency of the volume 250. The left-hand side of the row of images 265 shows the volume 250 with low transparency; in other words, high absorption. The portion 275 of the row of images 265 shows the volume 250 with the lowest transparency in the row of images 265. The right-hand side of the row of images 265 shows the volume 250 with high transparency; in other words, low absorption. The portion 285 of the row of images 265 shows the volume 250 with the highest transparency in the row of images 265.

Absorption models transport of light in the volume 250. Absorption can model the transport of light according to Beer's law, where the intensity of light decreases exponentially with increasing travel distance through the volume 250.

Figure 3A:
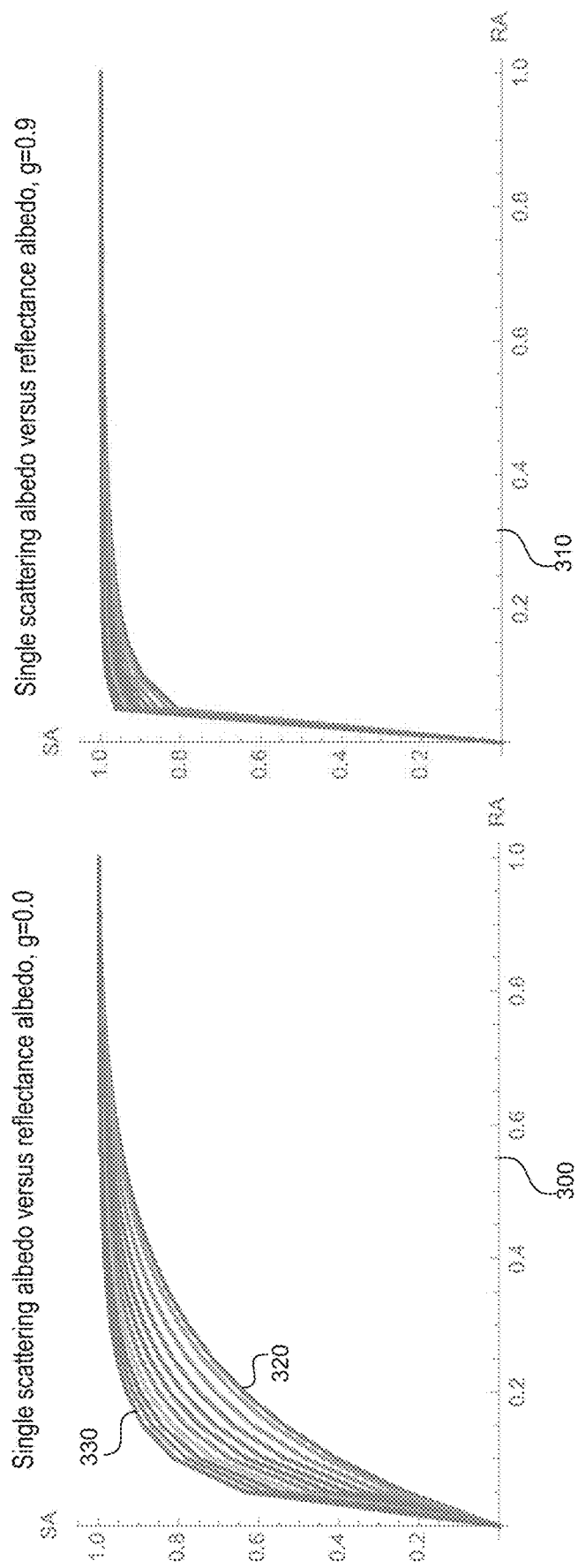
FIGS. 3A-3B show the relationship between single scattering albedo and reflectance albedo.
Figure 3B:
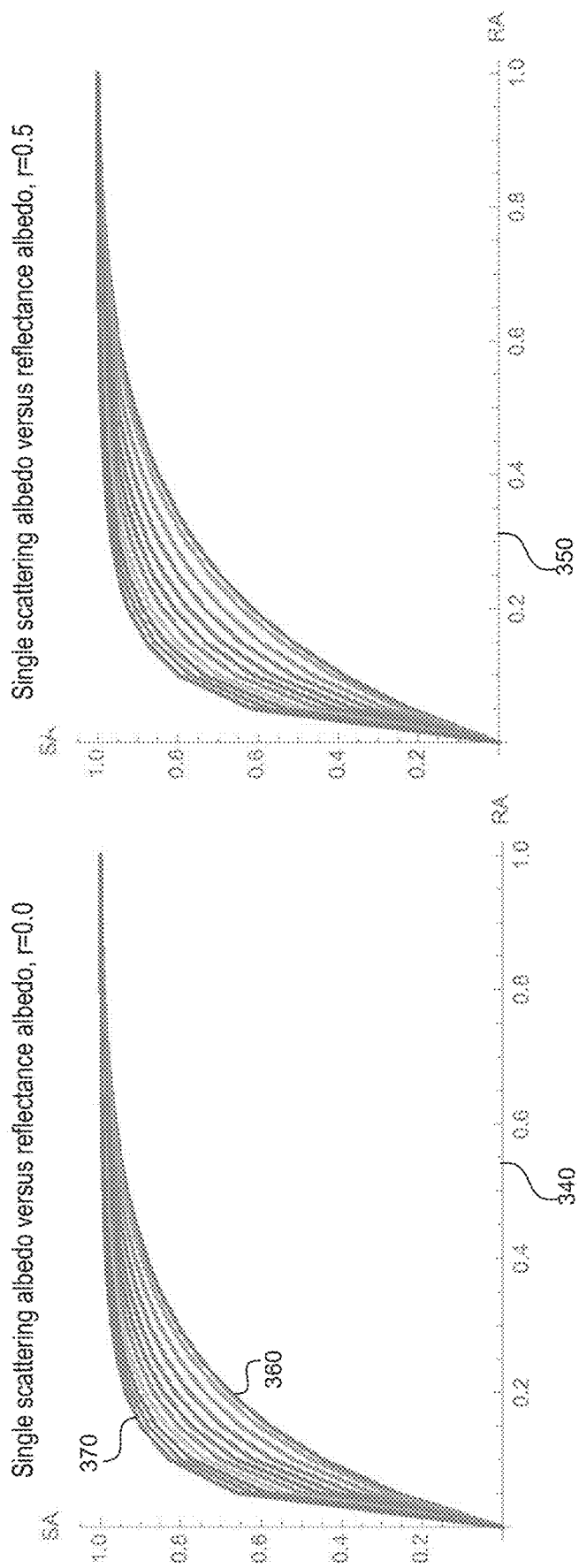

FIGS. 3A-3B show the relationship between single scattering albedo (SA) and reflectance albedo (RA). The SA is represented on the Y axis, and the RA is represented on the X axis. The RA is the diffuse color specified by the user. The system can calculate the absorption from the SA.

Graphs 300, 310 have a fixed surface roughness of 0.4 and a variable phase function. The phase function in graph 300 is isotropic, while the phase function in graph 310 is forward scattering. Forward scattering means that upon a scattering event, the ray of light is most likely to scatter in the forward direction. Every curve 320, 330 (only 2 labeled for brevity) corresponds to an IOR. The lowest curve 320 has IOR=1.0. Each subsequent curve represents an IOR increase of 0.1 until curve 320 reaches IOR=2.0. As can be seen in graphs 300, 310, the phase function influences the absorption of the volume. The higher the forward scattering, the longer the path of the ray of light through the volume. The longer the path of the light ray through the volume, the lower the absorption of the volume needs to be for the ray of light to make a contribution to the diffuse color of the surface.

Graphs 340, 350 have a fixed phase function and a varying surface roughness. The surface roughness is represented using a Beckmann distribution. The surface roughness in graph 350 is higher than the surface roughness in graph 340. Every curve 360, 370 (only 2 labeled for brevity) corresponds to an IOR. The lowest curve 360 has IOR=1.0. Each subsequent curve represents an IOR increase of 0.1 until curve 370 reaches IOR=2.0. As can be seen in graphs 340, 350, the phase function influences the absorption of the volume; however, the phase function does not have as much of an influence on the absorption of the volume as the phase function shown in FIG. 3A.

Figure 4:
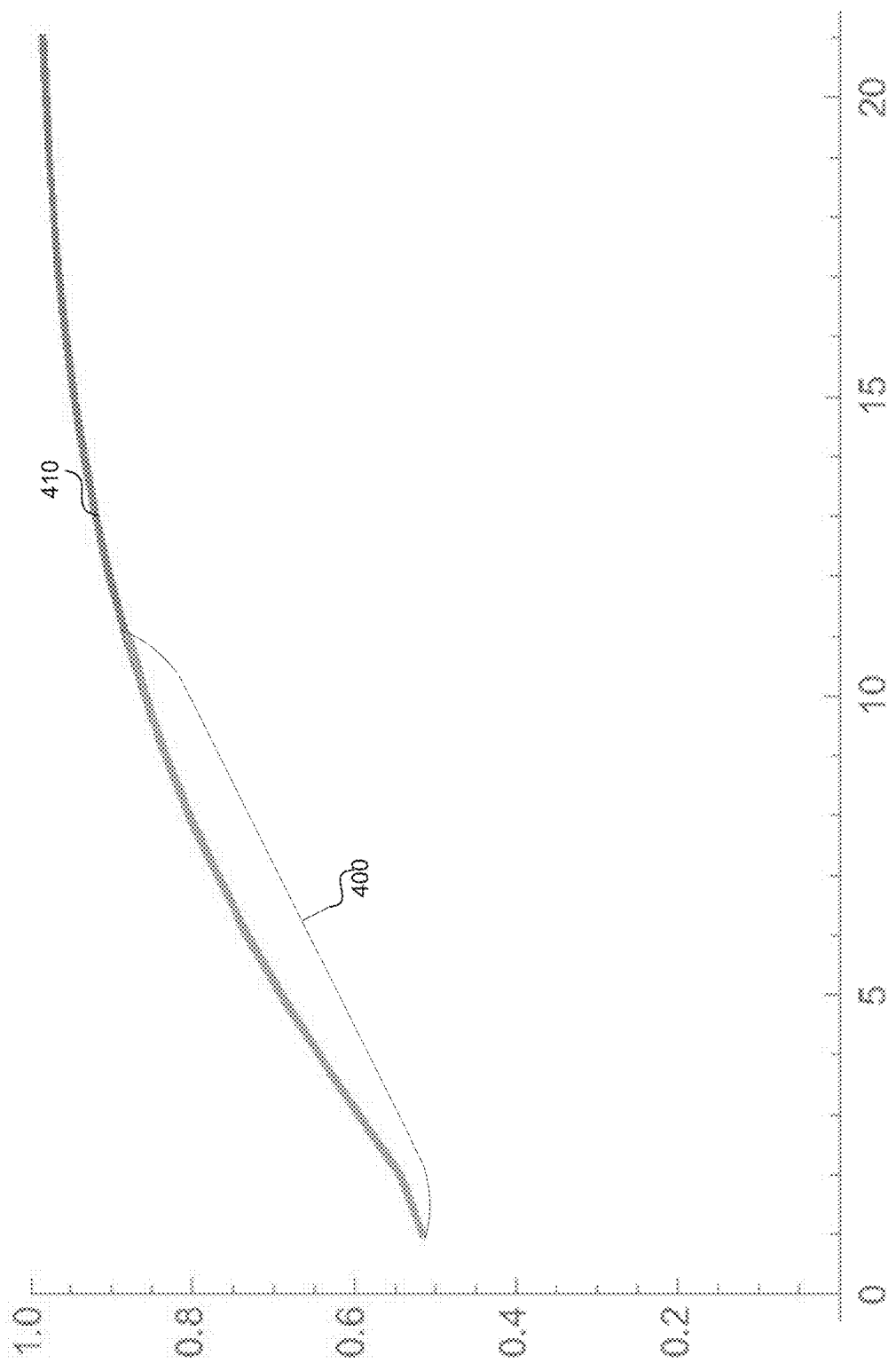
FIG. 4 shows the analytic function representing the IOR.

FIG. 4 shows the analytic function representing the IOR. The portion 400 is the simulated data and shows the IOR versus absorption data obtained from the simulation. The function 410 is the analytic function used to approximate the simulated data. The analytic function can be represented by the formula:

$$1-(Pow(Exp(-Pow(x,d)*c),a)*b).$$

As can be seen in FIG. 4, the analytic function is almost an exact fit to the simulated data 400.

Visual Content Generation System

Figure 5:
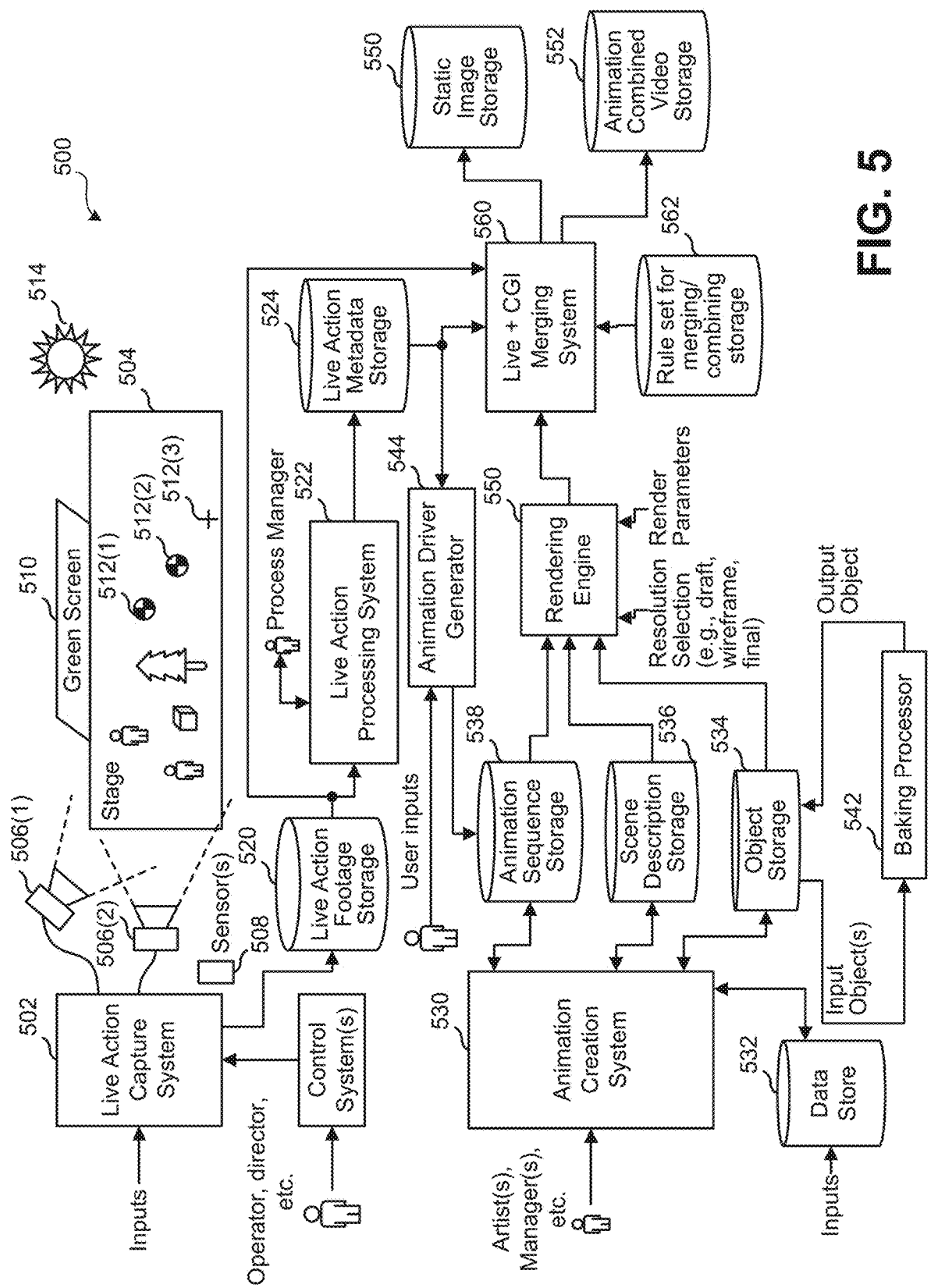
FIG. 5 illustrates an example visual content generation system as might be used to generate imagery in the form of still images and/or video sequences of images.

FIG. 5 illustrates an example visual content generation system 500 as might be used to generate imagery in the form of still images and/or video sequences of images. Visual content generation system 500 might generate imagery of live action scenes, computer generated scenes, or a combination thereof. In a practical system, users are provided with tools that allow them to specify, at high levels and low levels where necessary, what is to go into that imagery. For example, a user might be an animation artist and might use visual content generation system 500 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by visual content generation system 500 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution. Images might or might not be stored in a certain structured format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other embodiments, pixel values are data structures and a pixel value can be associated with a pixel and can be a scalar value, a vector, or another data structure associated with a corresponding pixel. That pixel value might include color values, or not, and might include depth values, alpha values, weight values, object identifiers or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 5, a live action capture system 502 captures a live scene that plays out on a stage 504. Live action capture system 502 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 506(1) and 506(2) capture the scene, while in some systems, there might be other sensor(s) 508 that capture information from the live scene (e.g., infrared cameras, infrared sensors, motion capture ("mo-cap") detectors, etc.). On stage 504, there might be human actors, animal actors, inanimate objects, background objects, and possibly an object such as a green screen 510 that is designed to be captured in a live scene recording in such a way that it is easily overlaid with computer-generated imagery. Stage 504 might also contain objects that serve as fiducials, such as fiducials 512(1)-(3), that might be used post-capture to determine where an object was during capture. A live action scene might be illuminated by one or more lights, such as an overhead light 514.

During or following the capture of a live action scene, live action capture system 502 might output live action footage to a live action footage storage 520. A live action processing system 522 might process live action footage to generate data about that live action footage and store that data into a live action metadata storage 524. Live action processing system 522 might include computer processing capabilities, image processing capabilities, one or more processors, program code storage for storing program instructions executable by the one or more processors, as well as user input devices and user output devices, not all of which are shown. Live action processing system 522 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 514, as that might be useful in post-processing to match computer-generated lighting on objects that are computer-generated and overlaid on the live action footage. Live action processing system 522 might operate autonomously, perhaps based on predetermined program instructions, to generate and output the live action metadata upon receiving and inputting the live action footage. The live action footage can be camera-captured data as well as data from other sensors.

An animation creation system 530 is another part of visual content generation system 500. Animation creation system 530 might include computer processing capabilities, image processing capabilities, one or more processors, program code storage for storing program instructions executable by the one or more processors, as well as user input devices and user output devices, not all of which are shown. Animation creation system 530 might be used by animation artists, managers, and others to specify details, perhaps programmatically and/or interactively, of imagery to be generated. From user input and data from a database or other data source, indicated as a data store 532, animation creation system 530 might generate and output data representing objects (e.g., a horse, a human, a ball, a teapot, a cloud, a light source, a texture, etc.) to an object storage 534, generate and output data representing a scene into a scene description storage 536, and/or generate and output data representing animation sequences to an animation sequence storage 538.

Scene data might indicate locations of objects and other visual elements, values of their parameters, lighting, camera location, camera view plane, and other details that a rendering engine 550 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 530 might be interactive, allowing a user to read in animation sequences, scene descriptions, object details, etc. and edit those, possibly returning them to storage to update or replace existing data. As an example, an operator might read in objects from object storage into a baking processor 542 that would transform those objects into simpler forms and return those to object storage 534 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from data store 532 might be used to drive object presentation. For example, if an artist is creating an animation of a spaceship passing over the surface of the Earth, instead of manually drawing or specifying a coastline, the artist might specify that animation creation system 530 is to read data from data store 532 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 544 might read in live action metadata, such as data representing movements and positions of body parts of a live actor during a live action scene. Animation driver generator 544 might generate corresponding animation parameters to be stored in animation sequence storage 538 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 522. Animation driver generator 544 might convert that movement data into specifications of how joints of an articulated CGI character are to move over time.

A rendering engine 550 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 550 might include computer processing capabilities, image processing capabilities, one or more processors, program code storage for storing program instructions executable by the one or more processors, as well as user input devices and user output devices, not all of which are shown.

Visual content generation system 500 can also include a merging system 560 that merges live footage with animated content. The live footage might be obtained and input by reading from live action footage storage 520 to obtain live action footage, by reading from live action metadata storage 524 to obtain details such as presumed segmentation in captured images segmenting objects in a live action scene from their background (perhaps aided by the fact that green screen 510 was part of the live action scene), and by obtaining CGI imagery from rendering engine 550.

A merging system 560 might also read data from rulesets for merging/combining storage 562. A very simple example of a rule in a ruleset might be "obtain a full image including a two-dimensional pixel array from live footage, obtain a full image including a two-dimensional pixel array from rendering engine 550, and output an image where each pixel is a corresponding pixel from rendering engine 550 when the corresponding pixel in the live footage is a specific color of green, otherwise output a pixel value from the corresponding pixel in the live footage."

Merging system 560 might include computer processing capabilities, image processing capabilities, one or more processors, program code storage for storing program instructions executable by the one or more processors, as well as user input devices and user output devices, not all of which are shown. Merging system 560 might operate autonomously, following programming instructions, or might have a user interface or programmatic interface over which an operator can control a merging process. In some embodiments, an operator can specify parameter values to use in a merging process and/or might specify specific tweaks to be made to an output of merging system 560, such as modifying boundaries of segmented objects, inserting blurs to smooth out imperfections, or adding other effects. Based on its inputs, merging system 560 can output an image to be stored in a static image storage 570 and/or a sequence of images in the form of video to be stored in an animated/combined video storage 572.

Thus, as described, visual content generation system 500 can be used to generate video that combines live action with computer-generated animation using various components and tools, some of which are described in more detail herein. While visual content generation system 500 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

One embodiment might include a carrier medium carrying image data or other data having details generated using the methods described herein. The carrier medium can comprise any medium suitable for carrying the image data or other data, including a storage medium, e.g., solid-state memory, an optical disk or a magnetic disk, or a transient medium, e.g., a signal carrying the image data such as a signal transmitted over a network, a digital signal, a radio frequency signal, an acoustic signal, an optical signal or an electrical signal.

Computer System

Figure 6:
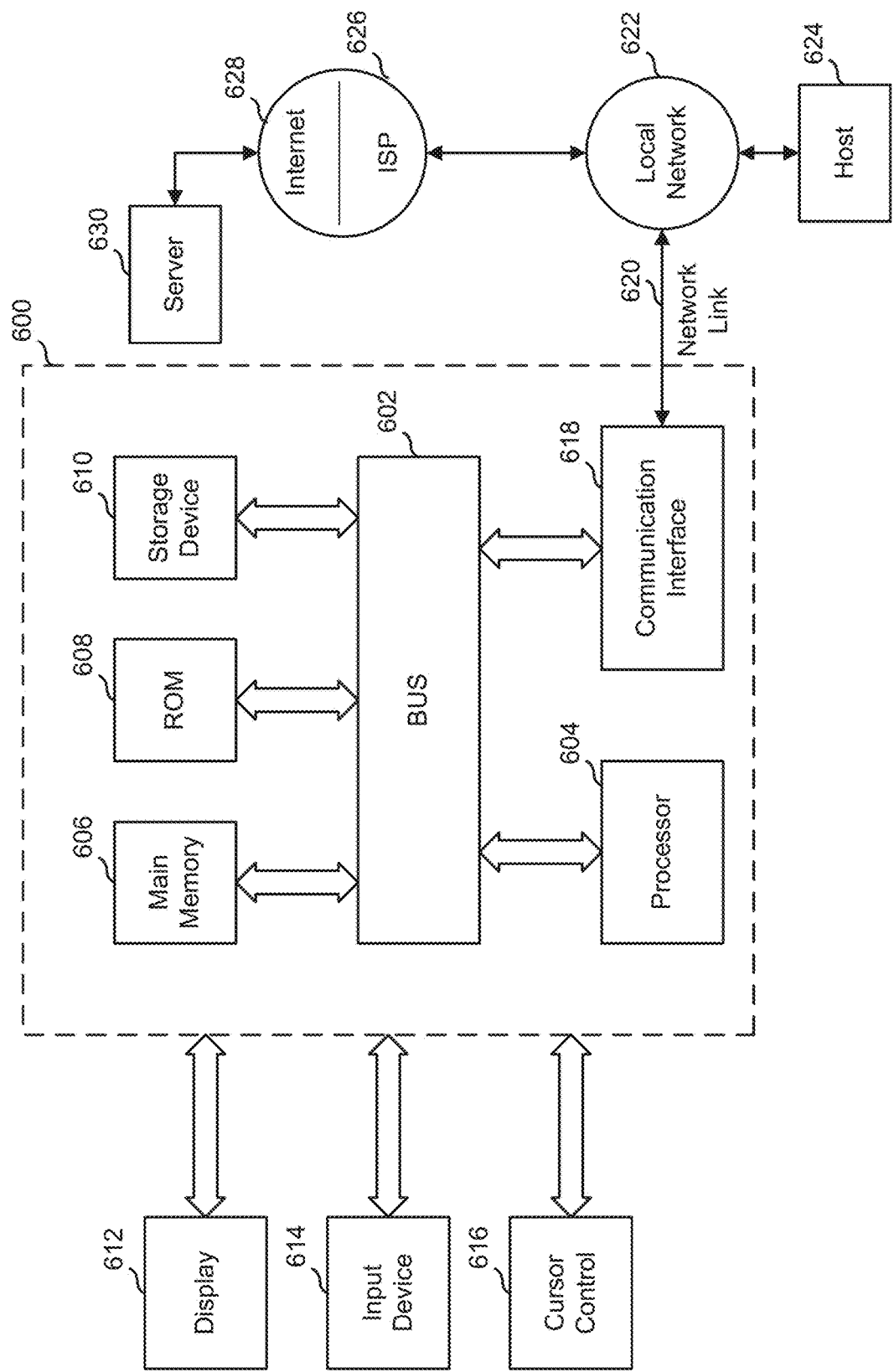
FIG. 6 is a block diagram that illustrates a computer system upon which the computer systems of the systems described herein and/or visual content generation system may be implemented.

FIG. 6 is a block diagram that illustrates a computer system 600 upon which the computer systems of the systems described herein and/or visual content generation system 500 (see FIG. 5) may be implemented. Computer system 600 includes a bus 602 or other communication mechanism for communicating information, and a processor 604 coupled with bus 602 for processing information. Processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 may also be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a computer monitor, for displaying information to a computer user. An input device 614, including alphanumeric and other keys, is coupled to bus 602 for communicating information and command selections to processor 604. Another type of user input device is a cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a network connection. A modem or network interface local to computer system 600 can receive the data. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be a network card, a modem, a cable modem, or a satellite modem to provide a data communication connection to a corresponding type of telephone line or communications line. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world-wide packet data communication network now commonly referred to as the "Internet" 628. Local network 622 and Internet 628 both use electrical, electromagnetic, or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620, and communication interface 618. In the Internet example, a server 630 might transmit a requested code for an application program through the Internet 628, ISP 626, local network 622, and communication interface 618. The received code may be executed by processor 604 as it is received, and/or stored in storage device 610, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

Flow Charts

Figure 7:
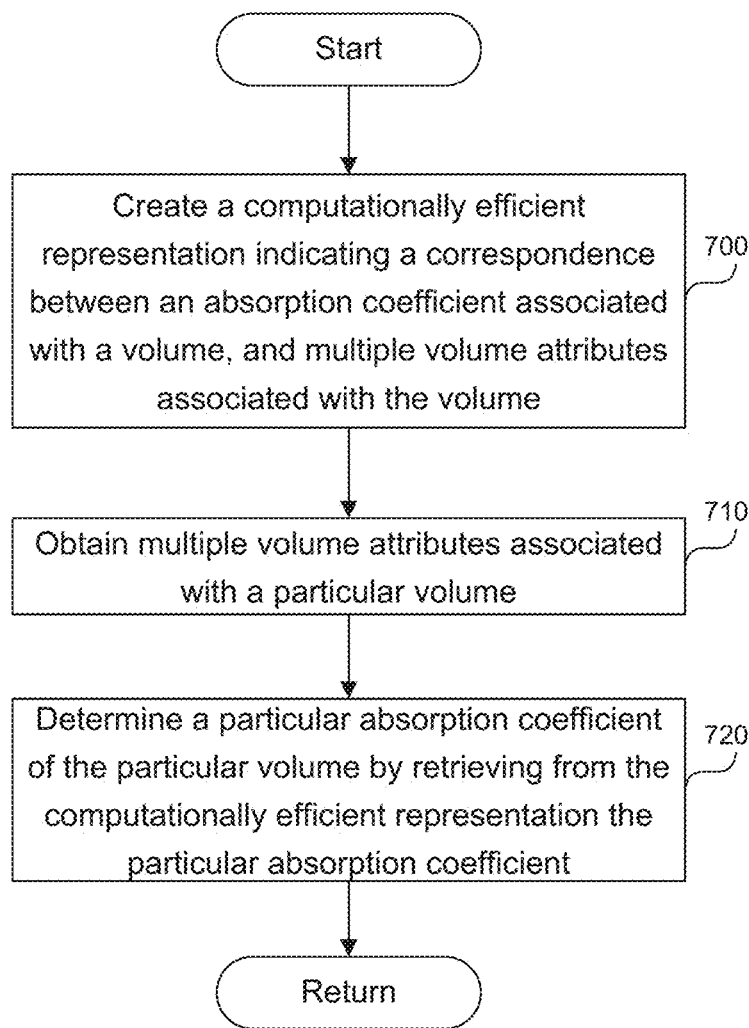
FIG. 7 is a flowchart of a method to efficiently determine an absorption coefficient of a volume.

FIG. 7 is a flowchart of a method to efficiently determine an absorption coefficient of a volume. In block 700, a hardware or a software processor executing the instructions described in this application can create a computationally efficient representation indicating a correspondence between an absorption coefficient associated with a volume, and multiple volume attributes associated with the volume. The computationally efficient representation can include an analytic function, or a lookup table, as described in this application. The computationally efficient representation can save both time and memory because the processor does not have to perform the simulation, and instead can obtain the absorption coefficient from the computationally efficient representation. To create the computationally efficient representation, the processor can simulate a virtual ray of light interacting with the volume based on the multiple volume attributes including a color, an index of refraction, a phase function, and a surface roughness. Since the simulation is computationally expensive, in both speed and memory, the processor can perform the simulation once and record the simulation results in the computationally efficient representation. Retrieving the absorption coefficient from the computationally efficient representation is considerably faster than obtaining the absorption coefficient by performing the simulation, by for example a thousand times. The processor can create the computationally efficient representation for each wavelength in the virtual ray of light. The virtual ray of light can include one or more wavelengths of electromagnetic radiation.

In block 710, the processor can obtain multiple volume attributes associated with a particular volume. The particular volume can be the volume that the user is shading. The multiple volume attributes associated with the particular volume are user-specified and include the color, the index of refraction, the phase function, and the surface roughness of the particular volume.

In block 720, the processor can determine a particular absorption coefficient of the particular volume by retrieving from the computationally efficient representation the particular absorption coefficient based on the multiple volume attributes associated with the particular volume without simulating the virtual ray of light interacting with the volume, thereby increasing speed of computation.

The processor can determine a numerically unstable volume attribute among the multiple volume attributes. When an attribute is numerically unstable, small differences in the attribute produce vast differences in the results. In some cases, to avoid numerical instability, the numerical precision of the attribute has to exceed the numerical precision of a computer. Consequently, in case of the numerically unstable attributes, the processor does not utilize the lookup table, and instead represents the attribute as an analytic function. The numerically unstable volume attribute can be the index of refraction. For example, when the index of refraction exceeds 2.0, small differences in the path of the virtual ray of light, produce vastly different results.

To determine the analytic function, the processor, based on the computationally efficient representation, can fit an analytic function to the numerically unstable volume attribute. For example, the processor can use the numerically stable portion of the attribute to fit the analytic function, as shown in FIG. 4, and can use the analytic function to extrapolate the behavior of the attribute in the numerically unstable region. The processor can determine the particular absorption coefficient of the particular volume based on the analytic function.

In one embodiment, the processor can use a neural network to determine the absorption coefficient based on inputs including the index of refraction, the phase function, and/or the surface roughness associated with the particular volume.

Figure 8:
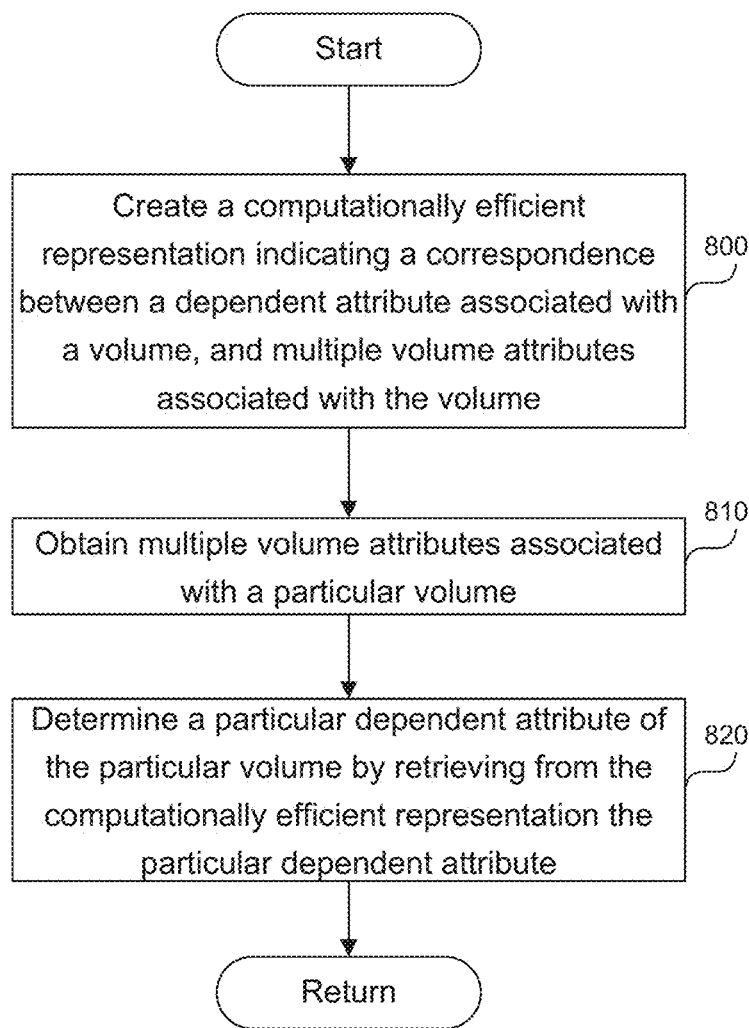
FIG. 8 is a flowchart of a method to efficiently determine an absorption coefficient of a volume.

FIG. 8 is a flowchart of a method to efficiently determine an absorption coefficient of a volume. In block 800, a processor can create a computationally efficient representation indicating a correspondence between a dependent attribute associated with a volume, and multiple volume attributes associated with the volume by simulating a virtual ray of light interacting with the volume based on the multiple volume attributes. The dependent attribute can be an absorption coefficient, a transparency, a scattering coefficient, a color, an index of refraction, a phase function, or a surface roughness. The dependent attribute depends on the multiple volume attributes.

In block 810, the processor can obtain multiple volume attributes associated with a particular volume, where the multiple volume attributes associated with the particular volume are user-specified. For example, if the dependent attribute is a scattering coefficient, the multiple volume attributes can include color, index of refraction, phase function, and surface roughness. If the dependent attribute is a phase function, the multiple volume attributes can include scattering coefficient, color, index of refraction, and surface roughness.

In block 820, the processor can determine a particular dependent attribute of the particular volume by retrieving from the computationally efficient representation the particular dependent attribute based on the multiple volume attributes without simulating the virtual ray of light interacting with the volume. By using the computationally efficient representation instead of performing the simulation, the processor can increase the speed of computation. The processor can perform additional steps as described in FIG. 7.

Remarks

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents, applications, and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or in a continuing application.

I claim:

1. A method comprising:
    creating a computationally efficient representation indicating a correspondence between an absorption coefficient associated with a volume, and multiple volume attributes associated with the volume, by simulating a virtual ray of light interacting with the volume based on the multiple volume attributes,
        wherein the multiple volume attributes include a color, an index of refraction, a phase function, and a surface roughness;
    obtaining the multiple volume attributes associated with a particular volume,
        wherein the multiple volume attributes associated with the particular volume are user-specified and include the color, the index of refraction, the phase function, and the surface roughness;
    determining a numerically unstable volume attribute among the multiple volume attributes,
        wherein the numerically unstable volume attribute includes the index of refraction exceeding 2.0;
    fitting an analytic function to the numerically unstable volume attribute; and
    based on the analytic function, determining a particular absorption coefficient of the particular volume by retrieving from the computationally efficient representation the particular absorption coefficient based on the multiple volume attributes associated with the particular volume without simulating the virtual ray of light interacting with the volume, thereby increasing speed of computation.

2. The method of claim 1, comprising:
    determining a second numerically unstable volume attribute among the multiple volume attributes;
    based on the computationally efficient representation, fitting a second analytic function to the second numerically unstable volume attribute; and
    determining the particular absorption coefficient of the particular volume based on the second analytic function.

3. The method of claim 1, comprising:
    fitting a second analytic function to a volume attribute among the multiple volume attributes; and
    determining the particular absorption coefficient of the particular volume based on the second analytic function.

4. The method of claim 1, the computationally efficient representation comprising a lookup table and/or the analytic function.

5. The method of claim 1, comprising:
    training a neural network to determine the absorption coefficient based on inputs including the index of refraction, the phase function, or the surface roughness associated with the particular volume.

6. The method of claim 1, the creating the computationally efficient representation comprising:
    creating the computationally efficient representation for each wavelength in the virtual ray of light,
        wherein the virtual ray of light includes one or more wavelengths of electromagnetic radiation.

7. At least one computer-readable storage medium, excluding transitory signals and carrying instructions, which, when executed by at least one data processor of a system, cause the system to:
    create a computationally efficient representation indicating a correspondence between a dependent attribute associated with a volume, and multiple volume attributes associated with the volume by simulating a virtual ray of light interacting with the volume based on the multiple volume attributes,
        wherein the dependent attribute depends on the multiple volume attributes;
    obtain the multiple volume attributes associated with a particular volume,
        wherein the multiple volume attributes associated with the particular volume are user-specified;
    determine a numerically unstable volume attribute among the multiple volume attributes,
        wherein the numerically unstable volume attribute includes an index of refraction exceeding 2.0;
    fit an analytic function to the numerically unstable volume attribute; and
    based on the analytic function, determine a particular dependent attribute of the particular volume by retrieving from the computationally efficient representation the particular dependent attribute based on the multiple volume attributes associated with the particular volume without simulating the virtual ray of light interacting with the volume, thereby increasing speed of computation.

8. The computer-readable storage medium of claim 7, wherein the dependent attribute comprises an absorption coefficient, a transparency, or a scattering coefficient.

9. The computer-readable storage medium of claim 7, further comprising the instructions to:
    determine a second numerically unstable volume attribute among the multiple volume attributes;
    based on the computationally efficient representation, fit a second analytic function to the second numerically unstable volume attribute; and
    determine the particular dependent attribute of the particular volume based on the second analytic function.

10. The computer-readable storage medium of claim 7, further comprising the instructions to:
    fit a second analytic function to a volume attribute among the multiple volume attributes; and
    determine the particular dependent attribute of the particular volume based on the second analytic function.

11. The computer-readable storage medium of claim 7, the computationally efficient representation comprising a lookup table and/or the analytic function.

12. The computer-readable storage medium of claim 7, further comprising the instructions to:

train a neural network to determine the dependent attribute based on inputs including the index of refraction, a phase function, or a surface roughness associated with the particular volume.

13. The computer-readable storage medium of claim 7, the instructions to create the computationally efficient representation further comprising the instructions to:
create the computationally efficient representation for each wavelength in the virtual ray of light,
wherein the virtual ray of light includes one or more wavelengths of electromagnetic radiation.

14. A system comprising:
at least one hardware processor;
at least one non-transitory memory storing instructions, which, when executed by the at least one hardware processor, cause the system to:
create a representation indicating a correspondence between an absorption coefficient associated with a volume, and multiple volume attributes associated with the volume, by simulating a virtual ray of light interacting with the volume based on the multiple volume attributes,
wherein the multiple volume attributes include a color, an index of refraction, a phase function, and a surface roughness;
obtain the multiple volume attributes associated with a particular volume,
wherein the multiple volume attributes associated with the particular volume are user-specified and include the color, the index of refraction, the phase function, and the surface roughness;
determine a numerically unstable volume attribute among the multiple volume attributes,
wherein the numerically unstable volume attribute includes the index of refraction exceeding 2.0;
fit an analytic function to the numerically unstable volume attribute; and
based on the analytic function, determine a particular absorption coefficient of the particular volume by retrieving from the representation the particular absorption coefficient based on the multiple volume attributes associated with the particular volume without simulating the virtual ray of light interacting with the volume, thereby increasing speed of computation.

15. The system of claim 14, further comprising the instructions to:
determine a second numerically unstable volume attribute among the multiple volume attributes;
based on the representation, fit a second analytic function to the second numerically unstable volume attribute; and
determine the particular absorption coefficient of the particular volume based on the second analytic function.

16. The system of claim 14, further comprising the instructions to:
fit a second analytic function to a volume attribute among the multiple volume attributes; and
determine the particular absorption coefficient of the particular volume based on the second analytic function.

17. The system of claim 14, the representation comprising a lookup table and/or the analytic function.

18. The system of claim 14, further comprising the instructions to:
train a neural network to determine the absorption coefficient based on inputs including the index of refraction, the phase function, or the surface roughness associated with the particular volume.

19. The system of claim 14, the instructions to create the representation further comprising the instructions to:
create the representation for each wavelength in the virtual ray of light,
wherein the virtual ray of light includes one or more wavelengths of electromagnetic radiation.

\* \* \* \* \*